United States Patent Office 3,382,118
Patented May 7, 1968

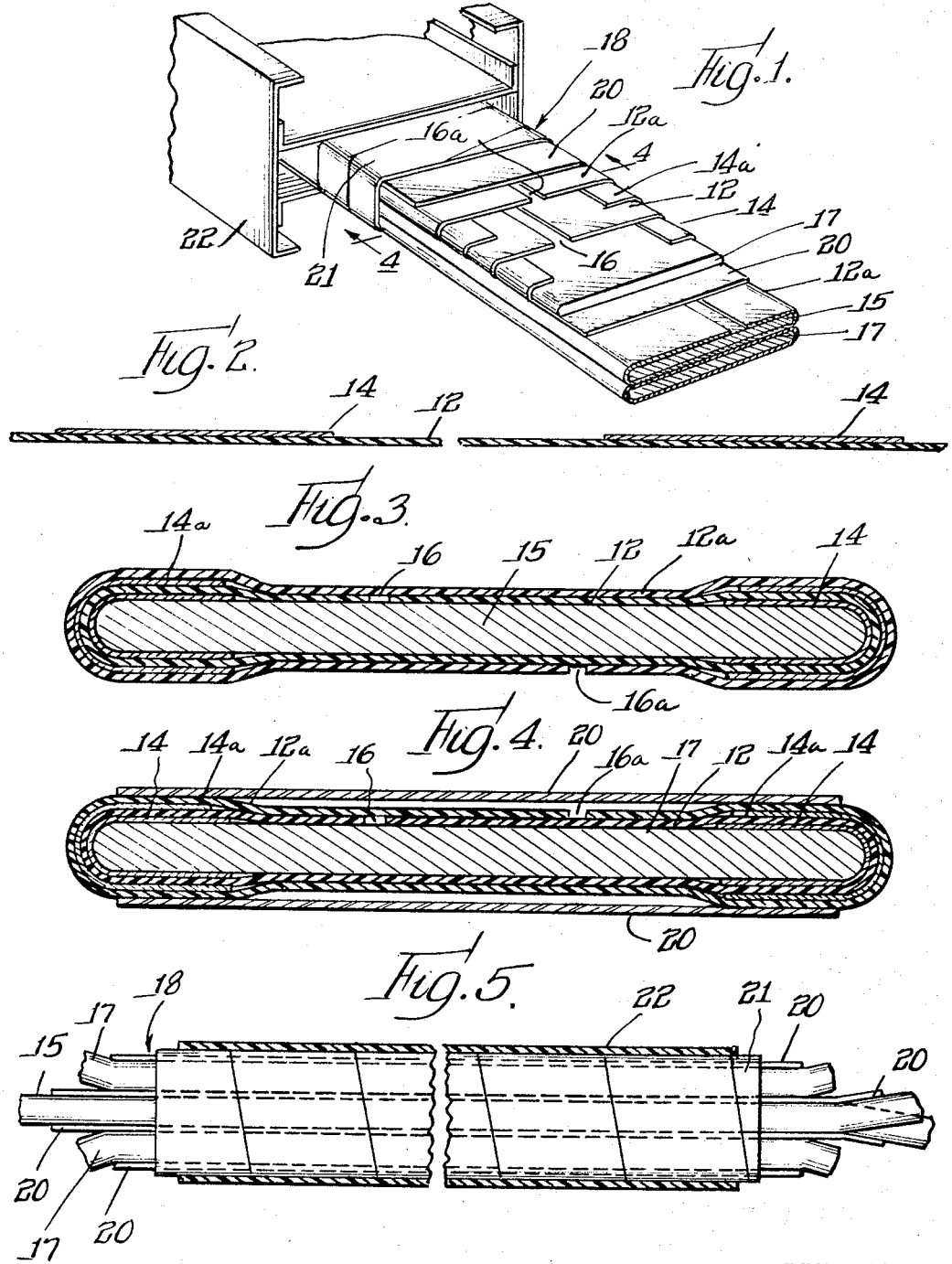

3,382,118
METHOD OF CONSTRUCTING AN ASSEMBLY OF BUS BARS
Harris I. Stanback, Lexington, Ky., assignor to Square D Company, Park Ridge, Ill., a corporation of Michigan
Original application Apr. 2, 1963, Ser. No. 269,970, now Patent No. 3,202,756, dated Aug. 24, 1965. Divided and this application Dec. 1, 1964, Ser. No. 415,094
3 Claims. (Cl. 156—54)

This application is a division of application, Serial No. 269,970, filed on Apr. 2, 1963 and now Patent No. 3,202,756 issued Aug. 24, 1965.

This invention relates generally to bus bar assemblies, and more particularly to a method of insulating bus bars in a bus duct structure.

For compactness and low reactance, it is desirable to position the bus bars of a bus duct structure extremely close to each other, but the closer to each other they are arranged, the more difficult it is to adequately electrically insulate them from each other.

An object of the present invention is to provide an improved bus duct structure in which the bus bars are arranged closer to each other than formerly.

Another object is to provide improved insulation for the bus bars of a bus duct.

A further object is to provide a compact bus duct structure in which the bus bars are arranged closer to each other than formerly and yet the bus duct has improved heat dissipating ability.

A still further object is to provide an improved method of applying insulation separately to flat bus bars of a bus duct, particularly with respect to opposite edge portions of the bus bars.

Yet another object is to provide the bus bars of a bus duct with insulation equivalent in insulating properties to films of polyester material wrapped completely around the respective bus bars without actually wrapping films of the difficult-to-form polyester material completely around the respective bus bars.

An additional object of the invention is to provide improved double insulation for the bus bars of a bus duct including alternate layers of two dissimilar insulating materials.

Other objects will appear when the following specification is considered along with the accompanying drawings in which:

FIGURE 1 is a perspective view of a portion of a bus duct structure constructed in accordance with this invention, parts thereof being progressively cut away lengthwise of the bus bars to better illustrate the insulating arrangement of the bus bar assembly;

FIGURE 2 is a fragmentary broken cross sectional view of a layer of insulation before it is applied to a bus bar in accordance with this invention;

FIGURE 3 is a cross sectional view of a bus bar having insulation applied thereto in accordance with this invention;

FIGURE 4 is a cross sectional view of a bus bar having insulation applied thereto in an alternate manner in accordance with this invention; and FIGURE 5 is a fragmentary edge view of a bus bar assembly constructed in accordance with this invention.

In FIGURE 2 a fragmentary broken cross sectional view of a strip 12 of adhesive varnished glass cloth is shown and may be thought of as extending lengthwise perpendicularly to the plane of the paper. A pair of parallel spaced strips 14 of polyester film, a strong and durable material having a relatively high dielectric strength and through which heat can be directly dissipated without substantially reducing the dielectric strength, are placed in position on the adhesive side of the strip 12 of varnished glass cloth.

The strip 12 with the two polyester film strips 14 thereon is applied to and wrapped substantially once around a flat bus bar as shown on a bus bar 15 in FIGURE 3 and on a bus bar 17 in FIGURE 4, the strips 14 respectively being formed substantially symmetrically around the opposite edge portions of the bus bar and the width of the strip 12 being such that a small gap 16 occurs between the opposite edges of the strip 12. Preferably a second strip 12a of adhesive varnished glass cloth with two parallel spaced strips 14a of polyester film thereon is then applied to and wrapped substantially once around the bus bar over the first strip 12, the strips 14a also respectively being formed substantially symmetrically around the opposite edge portions of the bus bar over the strip 12 and strips 14 and the width of the strip 12a being such that a small gap 16a occurs between the opposite edges of the strip 12a. The strips 12 and 12a may be applied from opposite sides of the bus bar, as shown on the bus bar 15 in FIGURE 3, or they may be applied from the same side of the bus bar, as shown on the bus bar 17 in FIGURE 4. The spacing of the strips 14a with respect to the opposite edges of a strip 12a is different from the spacing of the strips 14 with respect to the opposite edges of a strip 12, and thus the gaps 16 and 16a are spaced apart so as not to be aligned on the bus bar 17.

An exemplary bus bar assembly 18 using two of the insulated bus bars 17 and one of the insulated bus bars 15 is shown in FIGURES 1 and 5. Sheets of insulation 20, preferably of polyester material, are placed respectively between the bus bars and on the outer sides of the outer bus bars. The opposite edge portions of the sheets of insulation 20 overlap the strips 14 and 14a, thus producing insulation equivalent to films of polyester material wrapped completely around the respective bus bars. The individually wrapped bus bars and sheets of insulation 20 together are helically wound with epoxy impregnated glass cloth 21 to form the bus bar assembly 18. The bus bar assembly may then be adhesively secured within a housing 22 in intimate contact with the inner surfaces of one pair of opposed sidewall portions and in spaced relation to a second pair of opposed sidewall portions of the housing, as shown in FIGURES 1 and 5.

The gaps 16 and 16a are provided to eliminate overlapping of the opposite edges of the respective strips 12 and 12a. High spots are thus prevented and the wrapped bus bars 15 and 17 may be placed in intimate contact with the polyester sheets 20, air being entrapped substantially only at the gaps 16 and 16a. Good heat transfer to the housing 22 is thus assured. It should be noted that a large amount of air appears to be entrapped between the sheets 20 and the wrapped bus bar 17 in FIGURE 4. This is not so in an actual bus bar assembly constructed in accordance with the invention, but only appears so due to limitations of drawing. In actual practice, the strips of polyester film 14 and 14a may be as thin as two thousandths of an inch, the strips of varnished glass cloth 12 and 12a may be as thin as one hundredth of an inch, and the polyester sheets 20 may be as thin as one hundredth of an inch.

In the wrapping of the individual bus bars, adhesive could be applied to the polyester film strips 14 and 14a and the strips 14 and 14a could be applied separately to the bus bars. However, the strips 14 and 14a are preferably first applied to the strips 12 and 12a, respectively, in the manner described, and the strips 12 and 12a with the strips 14 and 14a thereon then applied to the bus bars.

It will thus be seen that an extremely compact bus bar assembly having low reactance, adequate electrical insulation, and low heat rise characteristics has been provided. Various modifications may be made in the structure and method of construction disclosed without departing from the spirit and scope of the invention.

I claim:
1. A method of constructing an assembly of bus bars, said method comprising
   (a) providing at least three flat elongated bus bars of substantially identical cross sections,
   (b) forming a plurality of elongated insulating sheets each having a width substantially equal to the greater cross sectional dimension of one of said bus bars.
   (c) forming a plurality of elongated strips of adhesive insulating material each having a width approximately equal to the periphery of one of said bus bars,
   (d) forming a plurality of elongated non-self-conforming strips of insulating film each having a width sufficient to cover a longitudinal edge face of one of said bus bars and portions of the bus bar on opposite sides thereof adjacent the longitudinal edge face,
   (e) placing a pair of said insulating film strips on each of said strips of adhesive insulating material in spaced parallel relationship with respect to each other and with respect to the opposite edges defining the width of the strip of adhesive insulating material,
   (f) individually wrapping each of said bus bars with at least one of said strips of adhesive insulating material and the pair of insulating film strips thereon in a manner respectively conforming said insulating film strips to the bus bar substantially symmetrically over opposite longitudinal edge faces of the bus bar and the portions on opposite sides thereof adjacent said longitudinal edge faces, and
   (g) securing said wrapped bus bars in flatwise stacked relationship with said insulating sheets respectively between adjacent bus bars and on the outer sides of the outer two bus bars in overlapping relationship with the formed insulating film strips.

2. A method of constructing an assembly of bus bars, said method comprising
   (a) providing at least three flat elongated bus bars of substantially identical cross sections,
   (b) forming a plurality of elongated insulating sheets each having a width substantially equal to the greater cross sectional dimension of one of said bus bars,
   (c) forming a plurality of elongated strips of adhesive insulating material each having a width approximately equal to the periphery of one of said bus bars,
   (d) forming a plurality of elongated non-self-conforming strips of insulating film each having a width sufficient to cover a longitudinal edge face of one of said bus bars and portions of the bus bar on opposite site sides thereof adjacent the longitudinal edge face,
   (e) placing a pair of said insulating film strips on each of said strips of adhesive insulating material in spaced parallel relationship with respect to each other and with respect to the opposite edges defining the width of the strip of adhesive insulating material,
   (f) individually wrapping each of said bus bars with at least one of said strips of adhesive insulating material and the pair of insulating film strips thereon in a manner respectively conforming said insulating film strips to the bus bar substantially symmetrically over opposite longitudinal edge faces of the bus bar and the portions on opposite sides thereof adjacent said longitudinal edge faces,
   (g) assembling said wrapped bus bars in flatwise stacked relationship with said insulating sheets respectively between adjacent bus bars and on the outer sides of the outer two bus bars in overlapping relationship with respect to the formed insulating film strips, and
   (h) helically wrapping said individually wrapped bus bars and said insulating sheets together with flexible insulating material.

3. A method of individually wrapping a flat elongated bus bar prior to grouping a plurality of individually wrapped bus bars together to form an assembly of bus bars, said method comprising
   (a) forming an elongated strip of adhesive insulating material of a width approximately equal to the periphery of the bus bar,
   (b) forming a pair of elongated non-self-conforming strips of insulating film each having a width sufficient to cover a longitudinal edge face of the bus bar and portions of the bus bar on opposite sides thereof adjacent the longitudinal edge face,
   (c) placing said insulating film strips on said strip of adhesive insulating material in spaced parallel relationship with respect to each other and with respect to the opposite edges defining the width of the strip of adhesive insulating material, and
   (d) wrapping said bus bar with said strip of adhesive insulating material and the insulating film strips thereon in a manner respectively conforming said insulating film strips to said bus bar substantially symmetrically over opposite longitudinal edge faces of the bus bar and the portions on opposite sides thereof adjacent said longitudinal edge faces.

No references cited.

EARL M. BERGERT, *Primary Examiner.*

T. R. SAVOIE, *Assistant Examiner.*